United States Patent
Chen et al.

(10) Patent No.: US 10,075,445 B2
(45) Date of Patent: Sep. 11, 2018

(54) METHODS AND DEVICES FOR PERMISSION MANAGEMENT

(71) Applicant: Xiaomi Inc., Beijing (CN)

(72) Inventors: QiaoZhuo Chen, Beijing (CN); Yin Zhu, Beijing (CN); Wenxin Li, Beijing (CN)

(73) Assignee: Xiaomi Inc., Beijing (CN)

( * ) Notice: Subject to any disclaimer, the term of this patent is extended or adjusted under 35 U.S.C. 154(b) by 112 days.

(21) Appl. No.: 15/073,363

(22) Filed: Mar. 17, 2016

(65) Prior Publication Data
US 2016/0323282 A1 Nov. 3, 2016

(30) Foreign Application Priority Data
Apr. 28, 2015 (CN) .......................... 2015 1 0209637

(51) Int. Cl.
| | | |
|---|---|---|
| G06F 21/32 | (2013.01) | |
| H04L 29/06 | (2006.01) | |
| G06F 3/0481 | (2013.01) | |
| G06F 3/0488 | (2013.01) | |
| G06K 9/00 | (2006.01) | |

(52) U.S. Cl.
CPC ............ H04L 63/10 (2013.01); G06F 3/0488 (2013.01); G06F 3/04817 (2013.01); G06F 21/32 (2013.01); G06K 9/00013 (2013.01); H04L 63/0861 (2013.01); G06K 9/00006 (2013.01)

(58) Field of Classification Search
None
See application file for complete search history.

(56) References Cited

U.S. PATENT DOCUMENTS

| | | | | |
|---|---|---|---|---|
| 2012/0110470 A1* | 5/2012 | Mistry | .................. | G06F 3/0486 715/748 |
| 2013/0227490 A1* | 8/2013 | Thorsander | ........... | G06F 3/0482 715/841 |
| 2013/0287272 A1* | 10/2013 | Lu | ........................... | G06F 3/041 382/124 |
| 2014/0055388 A1* | 2/2014 | Yook | ..................... | G06F 3/0416 345/173 |

(Continued)

FOREIGN PATENT DOCUMENTS

| | | |
|---|---|---|
| CN | 103488924 A | 1/2014 |
| CN | 103577739 A | 2/2014 |
| CN | 104469717 A | 3/2015 |

(Continued)

OTHER PUBLICATIONS

International Search Report dated Feb. 23, 2016 for International Application No. PCT/CN2015/095158, 4 pages.

(Continued)

*Primary Examiner* — Fatoumata Traore
(74) *Attorney, Agent, or Firm* — Brinks, Gilson & Lione

(57) ABSTRACT

Methods and devices are provided for permission management. In the method, the terminal obtains fingerprint information of a user based on a touch operation on a preset interface of the terminal by the user. The terminal determines whether the user is an authorized user according to the obtained fingerprint information. When determining that the user is an unauthorized user, the terminal disables a permission for modifying configurations of the terminal by the user.

19 Claims, 7 Drawing Sheets

(56) References Cited

U.S. PATENT DOCUMENTS

2014/0292666 A1* 10/2014 Shi ...................... G06F 3/0416
                                                          345/173

FOREIGN PATENT DOCUMENTS

| CN | 104765552 A | 7/2015 |
|----|---|---|
| EP | 1 857 954 A1 | 11/2007 |
| EP | 2 226 741 A1 | 9/2010 |
| EP | 3144835 A1 * | 3/2017 |
| GB | 2 490 593 A | 11/2012 |
| JP | H07-234837 A | 9/1995 |
| JP | 09-297609 A | 11/1997 |
| JP | 2000-090052 A | 3/2000 |
| JP | 2000-293253 A | 10/2000 |
| JP | 2005-006259 A | 1/2005 |
| JP | 2005-049546 A | 2/2005 |
| JP | 2007-310638 A | 11/2007 |
| JP | 2012-527657 A | 11/2012 |
| KR | 10-1474733 B1 | 12/2014 |
| KR | 10-2015-0014788 A | 2/2015 |
| WO | WO 2015/016524 A1 | 2/2015 |

OTHER PUBLICATIONS

English Translation of International Search Report dated Feb. 23, 2016 for International Application No. PCT/CN2015/095158, 4 pages.

Extended European Search Report dated Sep. 13, 2016 for European Application No. 16167047.6, 7 pages.

Office Action dated Nov. 14, 2016 for Russian Application No. 2016103765/08, 12 pages.

* cited by examiner

METHODS AND DEVICES FOR PERMISSION MANAGEMENT

CROSS-REFERENCE TO RELATED APPLICATION

This application is based upon and claims priority to Chinese Patent Application No. 201510209637.6 filed Apr. 28, 2015, the entire contents of which are incorporated herein by reference.

TECHNICAL FIELD

The present disclosure generally relates to communication field, and more particularly, to a method and a device for permission management.

BACKGROUND

When using a mobile phone, a user may usually modify desktop applications by some particular operations, such as a long-press operation. However, under such cases, a smart handheld terminal may be inadvertently operated by users who do not own this terminal.

SUMMARY

The present disclosure provides a method and a device for permission management.

According to a first aspect of embodiments of the present disclosure, there is provided a method for permission management, including: obtaining fingerprint information of a user based on a touch operation on a preset interface of a terminal by the user; determining whether the user is an authorized user according to the obtained fingerprint information; and when the user is an unauthorized user, disabling a permission for modifying configurations of the terminal by the user.

According to a second aspect of embodiments of the present disclosure, there is provided a device for permission management, including: a processor; and a memory for storing instructions executable by the processor; wherein the processor is configured to perform: obtaining fingerprint information of a user based on a touch operation on a preset interface of a terminal by the user; determining whether the user is an authorized user according to the obtained fingerprint information; and when the user is an unauthorized user, disabling a permission for modifying configurations of the terminal by the user.

According to a third aspect of embodiments of the present disclosure, there is provided a non-transitory computer-readable storage medium having stored therein instructions that, when executed by a processor of a terminal, causes the terminal to perform a method for permission management, the method including: obtaining fingerprint information of a user based on a touch operation on a preset interface of a terminal by the user; determining whether the user is an authorized user according to the obtained fingerprint information; and when the user is an unauthorized user, disabling a permission for modifying configurations of the terminal by the user.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
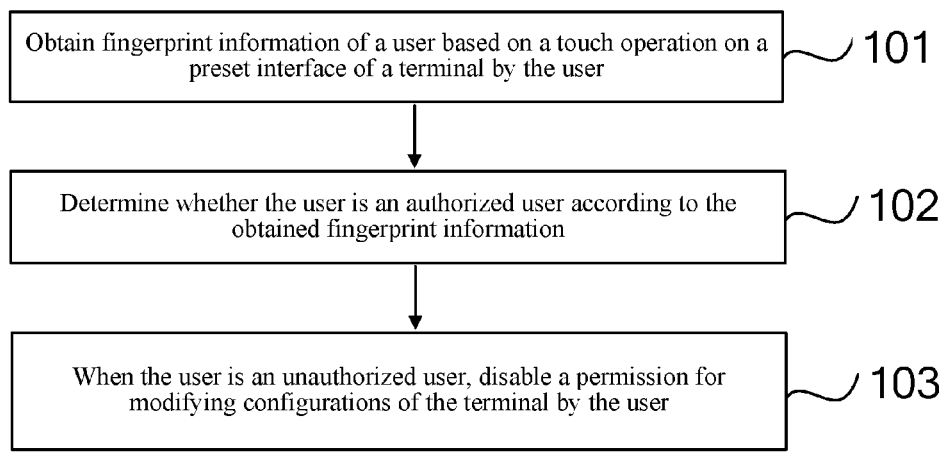
FIG. 1 is a flowchart showing a method for permission management according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminologies used herein are only for describing particular embodiments but not for limiting the present disclosure. The singular form words "a", "the", and "said" used in the present disclosure and append claims are intended to include plural form, unless otherwise clearly stated. Also, it shall be appreciated that the terminology "and/or" used herein refers to any or all combinations of one or more listed related items.

It shall be appreciated that although the present disclosure uses terminologies "first", "second", and "third" and the like to describe various information, the information shall not be limited by these terminologies. Using these terminologies is only for distinguishing information of the same type. For example, without departing from the scope of the present disclosure, the first information may be referred to as the second information, and similarly, the second information may be referred to as the first information. Depending on the context, the terminology "if" used herein may be interpreted as "when" or "in response to determining that . . . "

The present disclosure proposes a method for permission management. Fingerprint information of a user is obtained based on a touch operation on a preset interface of a terminal by the user, and whether the user is an authorized user is determined according to the obtained fingerprint information; when the user is an unauthorized user, a permission for modifying configurations of the terminal by the user is disabled. Thus, when a user who does not own the terminal is using the terminal, he/she cannot have the permission for modifying configurations of the terminal, and thereby the terminal security in usage is improved.

FIG. 1 is a method for permission management according to an exemplary embodiment. The method may be implemented in a terminal and includes the following steps. The terminal may include a smart phone, a media player, a laptop, a digital camera, a tablet, or any electronic device including a touch screen.

In step 101, the terminal obtains fingerprint information of a user based on a touch operation on a preset interface of a terminal by the user.

In step 102, the terminal determines whether the user is an authorized user according to the obtained fingerprint information.

In step 103, when the user is an unauthorized user, the terminal disables a permission for modifying configurations of the terminal by the user. For example, the terminal may deny the permission from the user to modify any system configuration.

In usage of a terminal, a user may usually modify applications on the system desktop of the terminal by some particular touch operations. Taking the MIUI system of Xiaomi Inc. as an example, a user may trigger operations such as deleting or dragging of applications by long-pressing icons of applications on the system desktop.

However, in the management on configuration modifying permission of users in conventional designs, authentication scheme of user identity is lacked, and even a user who does not own a terminal can normally have the permission for modifying applications by long-pressing icons of the applications on the system desktop. Thus, such designs increase the opportunities for inadvertent operations to some extent, and under an environment which raises higher requirements on security and privacy, such designs cannot meet users' demands.

In the one or more embodiments, aiming at the above problem, identity authentication scheme is introduced into existing management on configuration modifying permissions, fingerprint information of a user is obtained from a touch operation on a preset interface of a terminal when the user is regularly using the terminal, and then user identity authentication is performed by the obtained fingerprint information, and for a user determined as an unauthorized user, the permission for modifying configurations of the terminal by the user is disabled.

In the one or more embodiments, the fingerprint information of the user is obtained based on touch operations on the terminal in regular use of the terminal by the user. However, in regular use of the terminal by the user, the touched regions are usually not fixed, and thus the preset interface may include a visible region of a screen of the terminal.

In this disclosure, fingerprint sensor chip may be built into the visible region of the screen of the terminal in advance. Once the fingerprint sensor chip is built into the visible region of the screen, the whole screen of the terminal may be taken as a fingerprint recognition region for sampling user's fingerprint information. Thus, when the user uses the terminal normally, touch operations for any one region on the screen of the terminal by the user may be used for obtaining the fingerprint information of the user.

When the fingerprint information of the user is obtained, it is usually required that the user's finger totally presses on the screen of the terminal, and thus when obtaining the user's fingerprint information from touch operations on the terminal in regular usage, the user's fingerprint information may be obtained by monitoring long-press events on the visible region of the screen of the terminal by the user under an unlocked state.

For example, the terminal may firstly determine whether the terminal is in an unlocked state currently, and if the terminal is in an unlocked state currently, the terminal may start to monitor in real-time the touch events on the preset interface by the user, and determine whether a monitored touch event is a long-press event. If the monitored touch event is a long-press event, the terminal may obtain a touch point of the long-press event, and then obtain the fingerprint information of the user by the fingerprint sensor chip corresponding to the position of the touch point.

When the fingerprint information of the user is obtained, the terminal may match the obtained fingerprint information with fingerprint information of the authorized user which is registered in the terminal system in advance. If the obtained fingerprint information matches the fingerprint information of the authorized user which is registered in the terminal system in advance, it is indicated that the user who is currently using the terminal is an authorized user. There is not any limitation on the configuration modifying permission for an authorized user.

On the contrary, if the obtained fingerprint information does not match the fingerprint information of the authorized user which is registered in the terminal system in advance, it is indicated that the user who is currently using the terminal is an unauthorized user. For an unauthorized user, the configuration modifying permission for the user is limited.

In one or more embodiments, modifying of the configurations of the terminal may be triggered by some particular touch events of the user. For example, as stated above, a user may trigger operations such as deleting or dragging and the like of applications by a long-press operation on icons of the application on the system desktop of the terminal. Thus, when limiting the configuration modifying permission for an unauthorized user, the configuration modifying permission corresponding to the configuration modifying event triggered by the touch operation of the user may be disabled. The long-press operation may be triggered when the user press on the screen for a period of time longer than a preset threshold. For example, the preset threshold may be 0.5 second or one second.

The configuration modifying permission may include a permission for moving icons of applications, a permission for creating a new folder, a permission for removing applications from a folder, a permission for deleting applications and a permission for modifying system settings, and the like.

For example, when the fingerprint information of the user is successfully obtained based on the touch operation of the user, and the user is determined as an unauthorized user by fingerprint information matching, the terminal may firstly determine whether the touch operation of the user triggers a configuration modifying event; if the touch operation of the user triggers a configuration modifying event, the configuration modifying permission corresponding to the configuration modifying event may be disabled. For example, if a user tries to delete an application by performing a long-press operation on the icon of the application on the system desktop of the terminal, when the terminal monitors the long-press event in the background, the terminal may disable in the background the application deleting permission corresponding to the application deleting event triggered by the long-press event. After the application deleting permission is disabled, user's long-press operation on the icon of the application on the system desktop of the terminal cannot delete the application.

Rather, when the configuration modifying permission for an unauthorized user is disabled, the disabled permission types shall not be limited to the above-described permission for moving icons of applications, the permission for creating a new folder, the permission for removing applications from a folder, the permission for deleting applications and the permission for modifying system settings, but may be any one of or a combination of the above permissions. One of ordinary skill in this art may flexibly use these permissions according to actual requirements under different scenarios.

For example, when a terminal is used in a home environment, in order to prevent a child from deleting an icon of an application on the system desktop inadvertently or dragging icons of applications on the desktop to wrong positions when the child is playing with the terminal, the disabling of the configuration modifying permission for an unauthorized user may only include disabling of the permission for moving icons of applications, the permission for creating a new folder, the permission for removing an application from a folder, and the permission for deleting applications. When the terminal is used in a school or working environment, in order to guarantee the security and privacy of the user terminal, the disabling of the configuration modifying permission for an unauthorized user may also include the disabling of the permission for modifying system settings in addition to the permission for moving icons of applications, the permission for creating a new folder, the permission for removing an application from a folder, and the permission for deleting applications.

It shall be noted that, the disabling of the configuration modifying permission corresponding to the configuration modifying event triggered by the touch operation of the user may be realized by amending a pre-established triggering relationship between touch events and corresponding configuration modifying events in the terminal system.

For example, in conventional designs, a triggering relationship between a long-press event and events such as deleting or dragging icons of applications on the system desktop is usually pre-established in the terminal system. When the terminal monitors in the background a long-press event on an icon of an application on the system desktop by a user, the terminal may promptly trigger events such as deleting or dragging the icon of the application. Thus, the disabling of the permission for deleting or dragging icons on the system desktop triggered by the long-press operation by the user may be realized by amending or deleting the pre-established triggering relationship in the terminal system to make the triggering relationship invalid.

In the one or more embodiments, when the configuration modifying permission for a user is successfully disabled, prompt information may be output to the user through the preset interface for prompting the user. The prompt information may be a prompt box for prompting that the user does not have the modifying permission. Or, the prompt information may be a prompt box for prompting the user to re-perform fingerprint verification.

For example, a user performs a deleting or dragging operation on an icon of an application on the system desktop of the terminal by a long-press operation. It is assumed that the terminal obtains the fingerprint information of the user by monitoring the user's long-press event, and recognizes that the user is an unauthorized user by fingerprint information matching. In one implementation, the terminal may output on the system desktop of the terminal a textbox showing "you do not have the permission for editing the desktop" to prompt the user that he/she does not have the permission for editing the desktop. In another implementation, the terminal may output on the system desktop of the terminal a textbox showing "please long-press the desktop to re-obtain the permission for editing the desktop" to prompt the user that he/she does not have the permission for editing the desktop currently. Then the user may long-press the visible region of the screen of the terminal again to perform fingerprint verification to obtain the permission for editing the desktop.

In the one or more embodiments, after the terminal disables the configuration modifying permission for an unauthorized user, if an authorized user uses the terminal again, the terminal may obtain the fingerprint information of the user by monitoring the long-press event on the visible region of the screen of the terminal by the user, and may perform user identity authentication by matching the obtained fingerprint information with the fingerprint information of the authorized user which is registered in the system in advance; if the authentication is passed, the terminal does not impose any limitations on the configuration modifying permission for the user and thus the user may modify the configurations of the terminal normally.

In the above embodiments, the identity authentication scheme is introduced into management on configuration modifying permissions, fingerprint information of a user is obtained based on a touch operation on a preset interface of a terminal by the user, and whether the user is an authorized user is determined according to the obtained fingerprint information, and when the user is an unauthorized user, a permission for modifying configurations of the terminal by the user is disabled. Thus, when a user who does not own the terminal is using the terminal, he/she cannot have the permission for modifying configurations of the terminal, and thereby the terminal security in usage is improved.

Figure 2:
FIG. 2 is a flowchart showing another method for permission management according to an exemplary embodiment.

FIG. 2 shows a method for permission management according to an exemplary embodiment. The method is applied in a terminal and includes the follow steps.

In step 201, the terminal monitors touch events on a preset interface of the terminal by the user. The terminal may include a touch mobile terminal. For example, the mobile terminal may be a smart phone or a tablet computer of a user.

In step 202, the terminal determines whether a monitored touch event is a long-press event.

In step 203, when the monitored touch event is a long-press event, a touch point of the long-press event is obtained, and the fingerprint information of the user is obtained at the position of the touch point.

In step 204, the terminal determines whether the user is an authorized user according to the obtained fingerprint information.

In step 205, when the user is an unauthorized user, whether the long-press event triggers a configuration modifying event for the terminal is determined.

In step 206, when the long-press event triggers the configuration modifying event for the terminal, the permission for modifying configurations corresponding to the configuration modifying event is disabled.

In usage of a terminal, a user may usually modify applications on the system desktop of the terminal by some particular touch operations. Taking the MIUI system of Xiaomi Inc. as an example, a user may trigger operations such as deleting or dragging of applications by long-pressing icons of applications on the system desktop.

However, in the management on configuration modifying permission of users in conventional designs, authentication scheme of user identity is lacked, and even a user who does not own a terminal can normally have the permission for modifying applications by long-pressing icons of the applications on the system desktop. Thus, such designs increase the opportunities for inadvertent operations to some extent, and under an environment which raises higher requirements on security and privacy, such designs cannot meet users' demands.

In the one or more embodiments, aiming at the above problem, identity authentication scheme is introduced into existing management on configuration modifying permissions, fingerprint information of a user is obtained from a touch operation on a preset interface of a terminal when the user is regularly using the terminal, and then user identity authentication is performed by the obtained fingerprint information, and for a user determined as an unauthorized user, the permission for modifying configurations of the terminal by the user is disabled.

In the one or more embodiments, the fingerprint information of the user is obtained based on touch operations on the terminal in regular use of the terminal by the user. However, in regular use of the terminal by the user, the touched regions are usually not fixed, and thus the preset interface may include a visible region of a screen of the terminal.

In this disclosure, fingerprint sensor chip may be built into the visible region of the screen of the terminal in advance. Once the fingerprint sensor chip is built into the visible region of the screen, the whole screen of the terminal may be taken as a fingerprint recognition region for sampling user's fingerprint information. Thus, when the user uses the terminal normally, touch operations for any one region on the screen of the terminal by the user may be used for obtaining the fingerprint information of the user.

When the fingerprint information of the user is obtained, it is usually required that the user's finger totally presses on the screen of the terminal, and thus when obtaining the user's fingerprint information from touch operations on the terminal in regular usage, the user's fingerprint information may be obtained by monitoring long-press events on the visible region of the screen of the terminal by the user under an unlocked state.

For example, the terminal may firstly determine whether the terminal is in an unlocked state currently, and if the terminal is in an unlocked state currently, the terminal may start to monitor in real-time the touch events on the preset interface by the user, and determine whether a monitored touch event is a long-press event. If the monitored touch event is a long-press event, the terminal may obtain a touch point of the long-press event, and then obtain the fingerprint information of the user by the fingerprint sensor chip corresponding to the position of the touch point.

When the fingerprint information of the user is obtained, the terminal may match the obtained fingerprint information with fingerprint information of the authorized user which is registered in the terminal system in advance. If the obtained fingerprint information matches the fingerprint information of the authorized user which is registered in the terminal system in advance, it is indicated that the user who is currently using the terminal is an authorized user. There is not any limitation on the configuration modifying permission for an authorized user.

On the contrary, if the obtained fingerprint information does not match the fingerprint information of the authorized user which is registered in the terminal system in advance, the terminal may determine that the user who is currently using the terminal is an unauthorized user. For an unauthorized user, the terminal may limit the configuration modifying permission for the user.

In the one or more embodiments, modifying of the configurations of the terminal is usually triggered by some particular touch events of the user. For example, as stated above, a user may trigger operations such as deleting or dragging and the like of applications by a long-press operation on icons of the application on the system desktop of the terminal. Thus, when limiting the configuration modifying permission for an unauthorized user, the configuration modifying permission corresponding to the configuration modifying event triggered by the touch operation of the user may be disabled.

The configuration modifying permission may include a permission for moving icons of applications, a permission for creating a new folder, a permission for removing applications from a folder, a permission for deleting applications and a permission for modifying system settings, and the like.

For example, when the fingerprint information of the user is successfully obtained based on the touch operation of the user, and the user is determined as an unauthorized user by fingerprint information matching, the terminal may firstly determine whether the touch operation of the user triggers a configuration modifying event; if the touch operation of the user triggers a configuration modifying event, the configuration modifying permission corresponding to the configuration modifying event may be disabled. For example, if a user tries to delete an application by performing a long-press operation on the icon of the application on the system desktop of the terminal, when the terminal monitors the long-press event in the background, the terminal may disable in the background the application deleting permission corresponding to the application deleting event triggered by the long-press event. After the application deleting permission is disabled, user's long-press operation on the icon of the application on the system desktop of the terminal cannot delete the application.

Rather, when the configuration modifying permission for an unauthorized user is disabled, the disabled permission types shall not be limited to the above-described permission for moving icons of applications, the permission for creating a new folder, the permission for removing applications from a folder, the permission for deleting applications and the permission for modifying system settings, but may be any one of or a combination of the above permissions. One of ordinary skill in this art may flexibly use these permissions according to actual requirements under different scenarios.

For example, when a terminal is used in a home environment, in order to prevent a child from deleting an icon of an application on the system desktop inadvertently or dragging icons of applications on the desktop to wrong positions when the child is playing with the terminal, the disabling of the configuration modifying permission for an unauthorized user may only include disabling of the permission for moving icons of applications, the permission for creating a new folder, the permission for removing an application from a folder, and the permission for deleting applications.

When the terminal is used in a school or working environment, in order to guarantee the security and privacy of the user terminal, the disabling of the configuration modifying permission for an unauthorized user may also include the disabling of the permission for modifying system settings in addition to the permission for moving icons of applications, the permission for creating a new folder, the permission for removing an application from a folder, and the permission for deleting applications.

It shall be noted that, the disabling of the configuration modifying permission corresponding to the configuration modifying event triggered by the touch operation of the user may be realized by amending a pre-established triggering relationship between touch events and corresponding configuration modifying events in the terminal system.

Here, when the configuration modifying permission for a user is successfully disabled, prompt information may be output to the user through the preset interface for prompting the user. The prompt information may be a prompt box for prompting that the user does not have the modifying permission. Or, the prompt information may be a prompt box for prompting the user to re-perform fingerprint verification.

Figure 3:
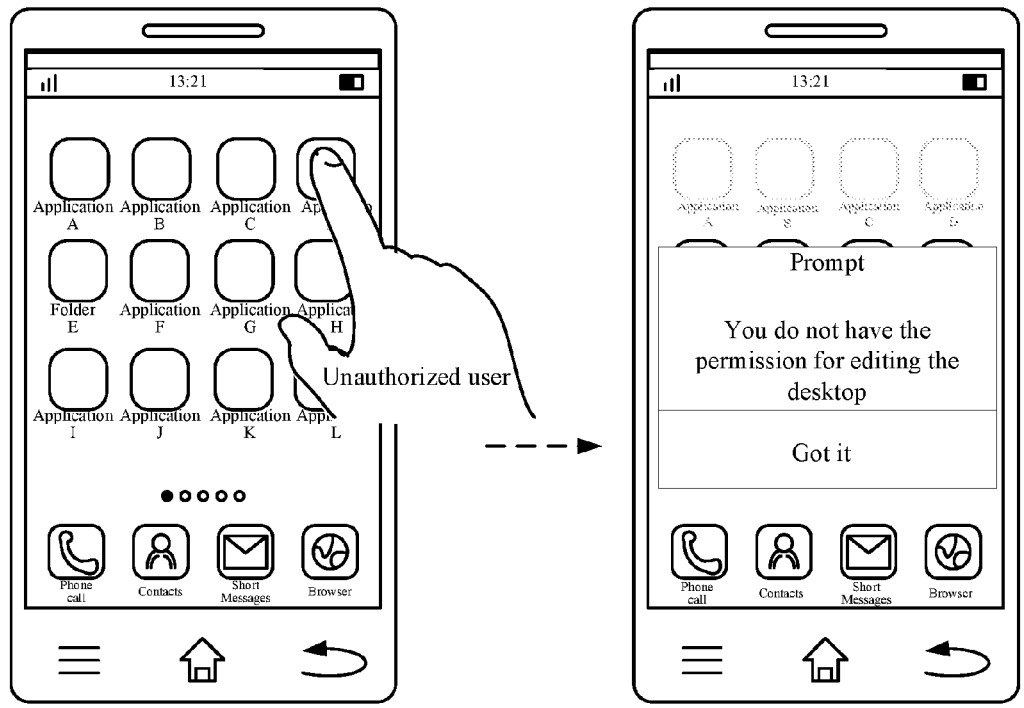
FIG. 3 is a diagram showing interactions on a system desktop according to an exemplary embodiment.
Figure 4:
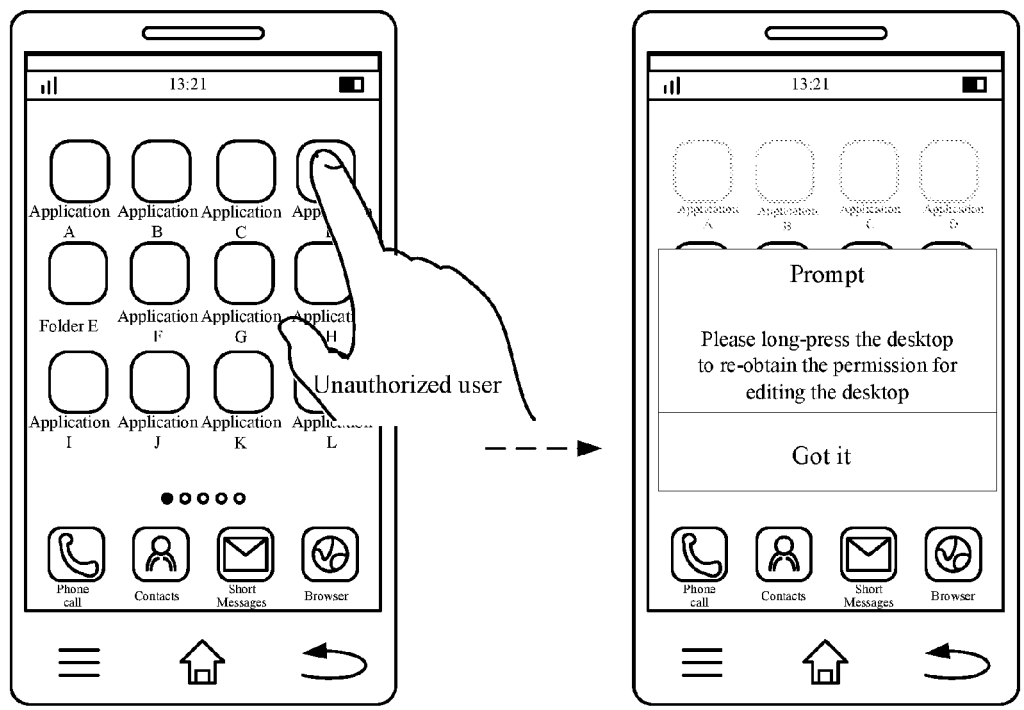
FIG. 4 is a diagram showing interactions on another system desktop according to an exemplary embodiment.

For example, referring to FIGS. 3 and 4, a user performs a deleting or dragging operation on an icon of an application on the system desktop of the terminal by a long-press operation. It is assumed that the terminal obtains the fingerprint information of the user by monitoring the user's long-press event, and recognizes that the user is an unauthorized user by fingerprint information matching. In one implementation, the terminal may output on the system desktop of the terminal a textbox showing "you do not have the permission for editing the desktop" (shown in FIG. 3) to prompt the user that he/she does not have the permission for editing the desktop. In another implementation, the terminal may output on the system desktop of the terminal a textbox showing "please long-press the desktop to re-obtain the permission for editing the desktop" (shown in FIG. 4) to prompt the user that he/she does not have the permission for editing the desktop currently. Then the user may long-press the visible region of the screen of the terminal again to perform fingerprint verification to obtain the permission for editing the desktop.

In the one or more embodiments, after the terminal disables the configuration modifying permission for an unauthorized user, if an authorized user uses the terminal again, the terminal may obtain the fingerprint information of the user by monitoring the long-press event on the visible region of the screen of the terminal by the user, and may perform user identity authentication by matching the obtained fingerprint information with the fingerprint information of the authorized user which is registered in the system in advance; if the authentication is passed, the terminal does not impose any limitations on the configuration modifying permission for the user and thus the user may modify the configurations of the terminal normally.

In the above embodiments, the identity authentication scheme is introduced into management on configuration modifying permissions, fingerprint information of a user is obtained based on a touch operation on a preset interface of a terminal by the user, and whether the user is an authorized user is determined according to the obtained fingerprint information, and when the user is an unauthorized user, a permission for modifying configurations of the terminal by the user is disabled. Thus, when a user who does not own the terminal is using the terminal, he/she cannot have the permission for modifying configurations of the terminal, and thereby the terminal security in usage is improved.

Corresponding to the above embodiments of the method for permission management, the present disclosure further provides embodiments of a device.

Figure 5:
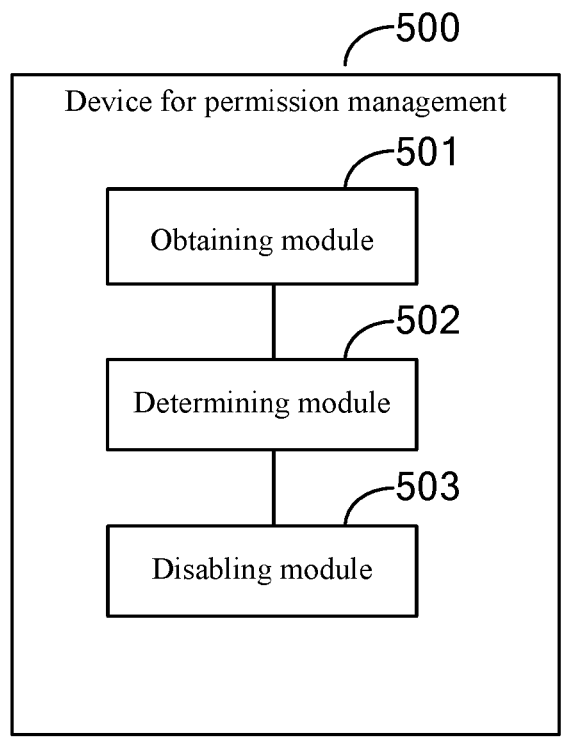
FIG. 5 is a block diagram showing a device for permission management according to an exemplary embodiment.

FIG. 5 is a block diagram showing a device for permission management according to an exemplary embodiment.

As shown in FIG. 5, the device 500 for permission management according to an exemplary embodiment includes an obtaining module 501, a determining module 502 and a disabling module 503.

The obtaining module 501 is configured to obtain fingerprint information of a user based on a touch operation on a preset interface of a terminal by the user.

The determining module 502 is configured to determine whether the user is an authorized user according to the obtained fingerprint information.

The disabling module 503 is configured to, when the user is an unauthorized user, disable a permission for modifying configurations of the terminal by the user.

In the above embodiment, the identity authentication scheme is introduced into management on configuration modifying permissions, fingerprint information of a user is obtained based on a touch operation on a preset interface of a terminal by the user, and whether the user is an authorized user is determined according to the obtained fingerprint information, and when the user is an unauthorized user, a permission for modifying configurations of the terminal by the user is disabled. Thus, when a user who does not own the terminal is using the terminal, he/she cannot have the permission for modifying configurations of the terminal, and thereby the terminal security in usage is improved.

Figure 6:
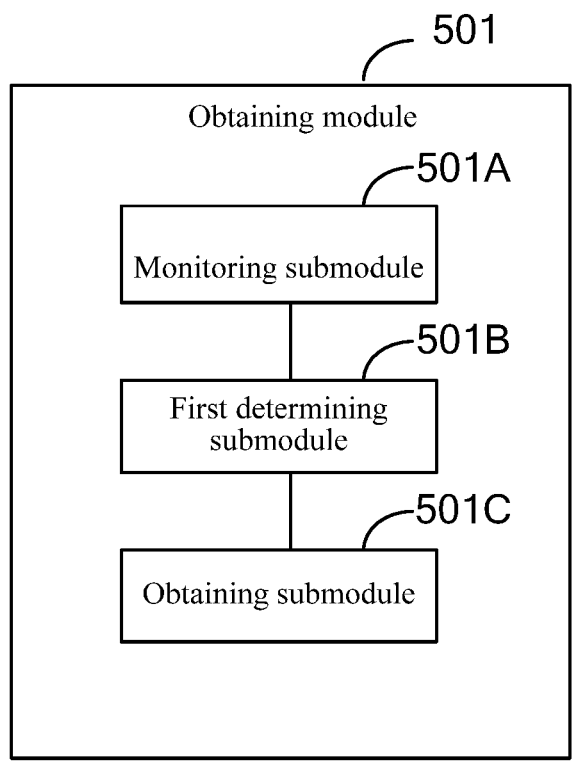
FIG. 6 is a block diagram showing another device for permission management according to an exemplary embodiment.

FIG. 6 is a block diagram showing another device according to an exemplary embodiment of the present disclosure. On the basis of the embodiment as shown in FIG. 5, in the embodiment of FIG. 6, the touch operation includes a long-press operation; the obtaining module 501 includes a monitoring submodule 501A, a first determining submodule 501B and an obtaining submodule 501C.

The monitoring submodule 501A is configured to monitor touch events on the preset interface of the terminal by the user.

The first determining submodule 501B is configured to determine whether a monitored touch event is a long-press event The obtaining submodule 501C is configured to, when the monitored touch event is a long-press event, obtain a touch point of the long-press event, and obtain the fingerprint information of the user at the position of the touch point.

Figure 7:
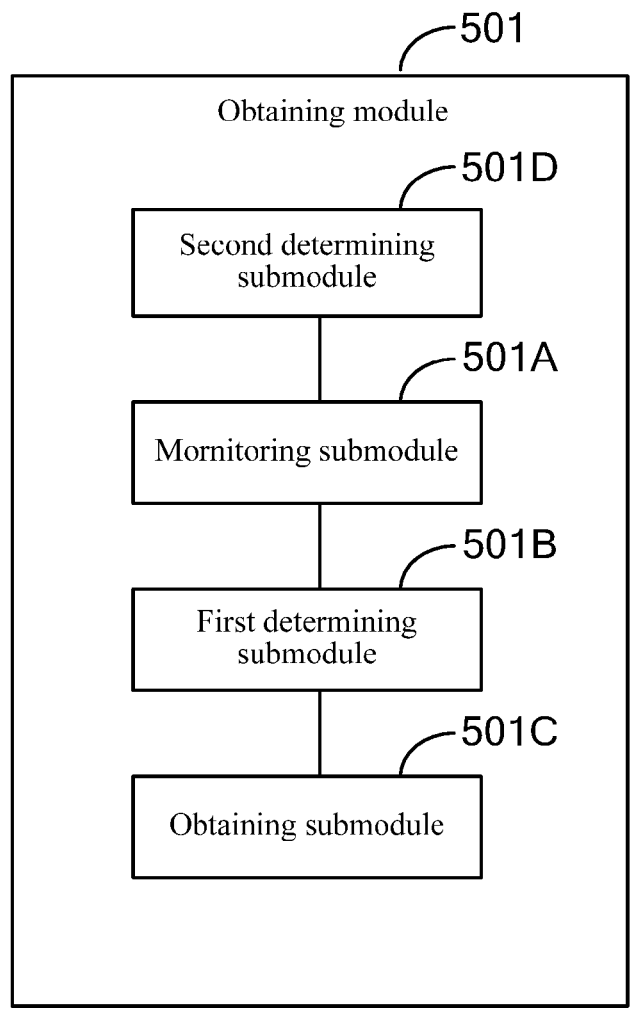
FIG. 7 is a block diagram showing another device for permission management according to an exemplary embodiment.

FIG. 7 is a block diagram showing another device according to an exemplary embodiment of the present disclosure. On the basis of the embodiment as shown in FIG. 6, in the embodiment of FIG. 7, the obtaining module 501 may further include a second determining submodule 501D.

The second determining submodule 501D is configured to, before the monitoring submodule 501A monitoring touch events on the preset interface of the terminal by the user, determine whether the terminal is unlocked; wherein when the terminal is unlocked, the monitoring submodule 501A starts to monitor touch events on the preset interface of the terminal by the user.

In the above embodiments, the preset interface includes a visible region of a screen of the terminal.

It shall be noted that the structure of the second determining submodule 501D shown in the embodiment of the device in FIG. 7 may also be included in the embodiment of the device as shown in FIG. 5, and the present disclosure does not impose limitations on this.

For realizing of functions and roles of respective modules in the above devices, refer to the above description regarding corresponding steps in the methods, and detailed descriptions are omitted.

Figure 8:
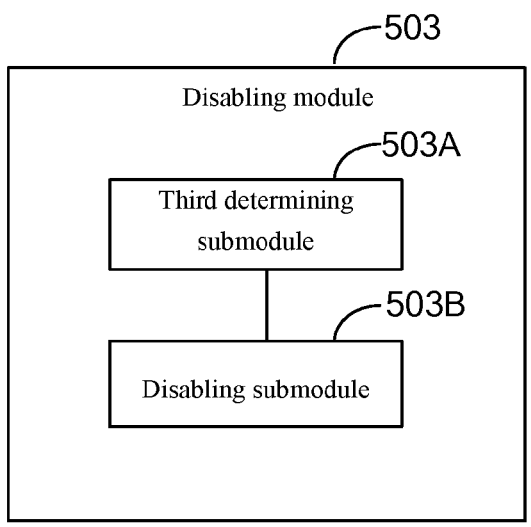
FIG. 8 is a block diagram showing another device for permission management according to an exemplary embodiment.

FIG. 8 is a block diagram showing another device according to an exemplary embodiment of the present disclosure. On the basis of the embodiment shown in FIG. 5, the disabling module 503 in the embodiment shown in FIG. 8 may include a third determining submodule 503A and a disabling submodule 503B.

The third determining submodule 503A is configured to, when the user is an unauthorized user, determine whether the touch operation triggers a configuration modifying event for the terminal.

The disabling submodule 503B is configured to, when the touch operation triggers the configuration modifying event for the terminal, disable the permission for modifying configurations corresponding to the configuration modifying event.

It shall be noted that the structure of the third determining submodule 503A and the disabling submodule 503B shown in the embodiment of the device in FIG. 8 may also be included in the embodiments of the devices as shown in FIGS. 6 and 7, and the present disclosure does not impose limitations on this.

For realizing of functions and roles of respective modules in the above devices, refer to the above description regarding corresponding steps in the methods, and detailed descriptions are omitted.

Figure 9:
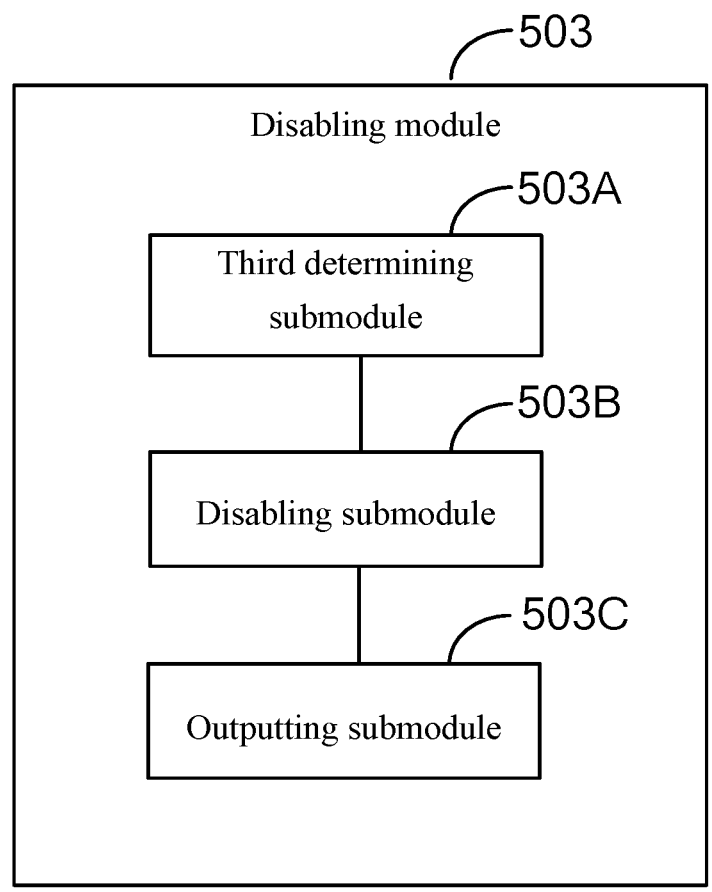
FIG. 9 is a block diagram showing another device for permission management according to an exemplary embodiment.

FIG. 9 is a block diagram showing another device according to an exemplary embodiment of the present disclosure. On the basis of the embodiment shown in FIG. 8, the disabling module 503 in the embodiment shown in FIG. 9 may further include an outputting submodule 503C.

The outputting submodule 503C is configured to, after the permission for modifying configurations corresponding to the configuration modifying event is disabled, output prompt information to the user through the preset interface.

In the above embodiments, the permission for modifying configurations includes a permission for moving icons of applications, a permission for creating a new folder, a permission for removing applications from a folder, a permission for deleting applications and a permission for modifying system settings.

It shall be noted that the structure of the outputting submodule 503C shown in the embodiment of the device in FIG. 9 may also be included in the embodiments of the devices as shown in FIGS. 5 to 7, and the present disclosure does not impose limitations on this.

For realizing of functions and roles of respective modules in the above devices, refer to the above description regarding corresponding steps in the methods, and detailed descriptions are omitted.

The embodiments of devices basically correspond to the embodiments of methods, and thus for related portions, the description about the embodiments of methods may be referred to. The above described embodiments of devices are only illustrative, and portions described as separated modules may be or may not be physically separated, and the portions shown as respective modules may be or may not be physical modules, i.e., the portions may be located at one place, or may be distributed over a plurality of network modules. A part or whole of the modules may be selected to realize the objects of the technical solutions of the present disclosure according to actual requirements. One of ordinary skill in this art may understand and practice the technical solutions of the present disclosure without creative work.

Correspondingly, the present disclosure further provides a device for permission management. The device includes: a processor; and a memory for storing instructions executable by the processor. The processor is configured to perform acts including:

obtaining fingerprint information of a user based on a touch operation on a preset interface of a terminal by the user;

determining whether the user is an authorized user according to the obtained fingerprint information; and when the user is an unauthorized user, disabling a permission for modifying configurations of the terminal by the user.

Correspondingly, the present disclosure further provides a terminal. The terminal includes a memory and one or more programs. The one or more programs are stored in the memory, and are configured to be executed by one or more processors. When the programs are executed, the one or more processors perform following acts:

obtaining fingerprint information of a user based on a touch operation on a preset interface of a terminal by the user; determining whether the user is an authorized user according to the obtained fingerprint information; and when the user is an unauthorized user, disabling a permission for modifying configurations of the terminal by the user.

Figure 10:
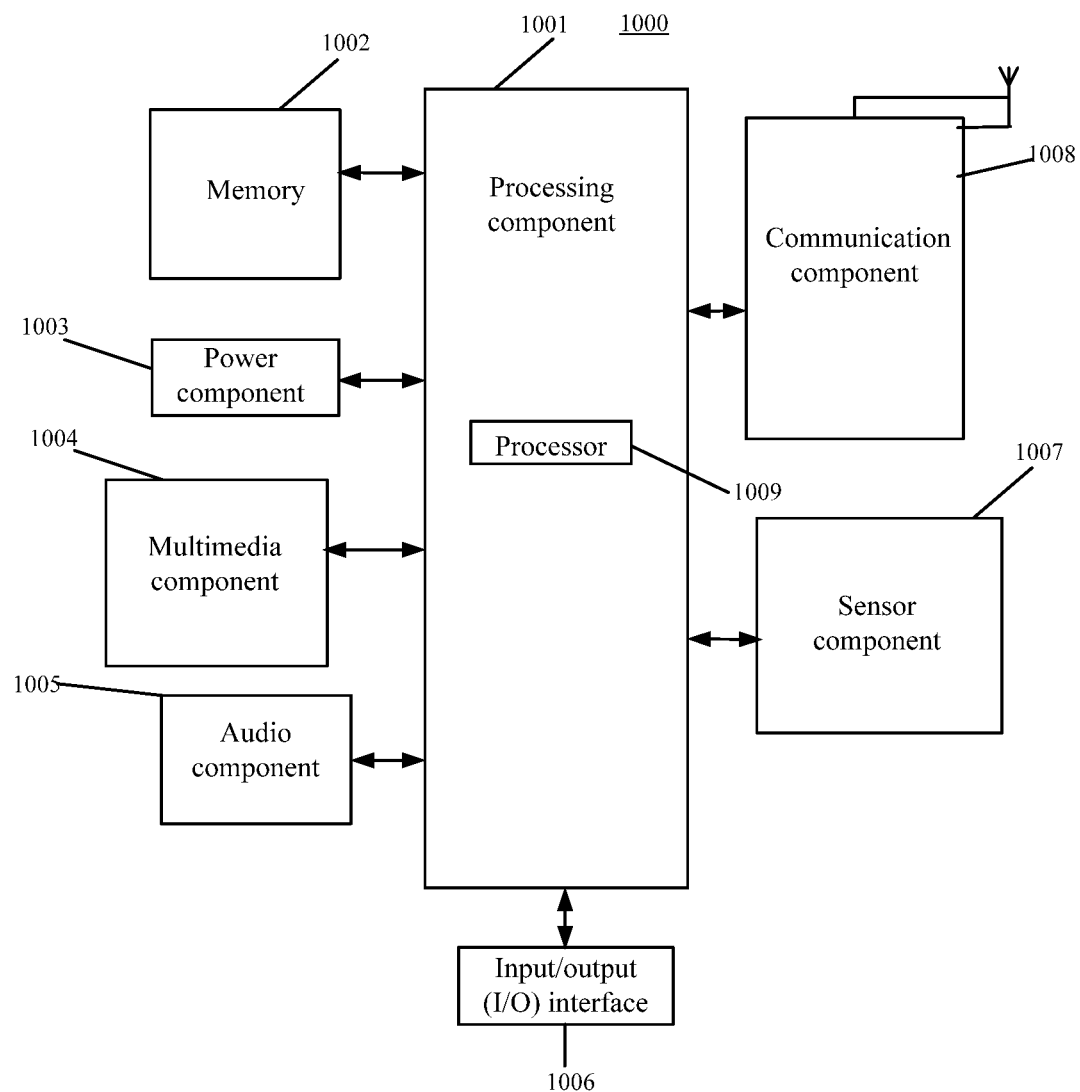
FIG. 10 is a block diagram showing a structure for the device for permission management according to an exemplary embodiment.

FIG. 10 is a block diagram showing a structure of a device for permission management according to an exemplary embodiment.

FIG. 10 is a block diagram of a device 1000 for permission management according to an exemplary embodiment. For example, the device 1000 may be a mobile phone, a computer, a digital broadcast terminal, a messaging device, a gaming console, a tablet, a medical device, exercise equipment, a personal digital assistant, and the like.

Referring to FIG. 10, the device 1000 may include one or more of the following components: a processing component 1001, a memory 1002, a power component 1003, a multimedia component 1004, an audio component 1005, an input/output (I/O) interface 1006, a sensor component 1007, and a communication component 1008.

The processing component 1001 typically controls overall operations of the device 1000, such as the operations associated with display, telephone calls, data communications, camera operations, and recording operations. The processing component 1001 may include one or more processors 1009 to execute instructions to perform all or part of the steps in the above described methods. Moreover, the processing component 1001 may include one or more modules which facilitate the interaction between the processing component 1001 and other components. For instance, the processing component 1001 may include a multimedia module to facilitate the interaction between the multimedia component 1004 and the processing component 1001.

The memory 1002 is configured to store various types of data to support the operation of the device 1000. Examples of such data include instructions for any applications or methods operated on the device 1000, contact data, phonebook data, messages, pictures, video, etc. The memory 1002 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1003 provides power to various components of the device 1000. The power component 1003 may include a power management system, one or more power sources, and any other components associated with the generation, management, and distribution of power in the device 1000.

The multimedia component 1004 includes a screen providing an output interface between the device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1004 includes a front camera and/or a rear camera. The front camera and the rear camera may receive an external multimedia datum while the device 1000 is in an operation mode, such as a photographing mode or a video mode. Each of the front camera and the rear camera may be a fixed optical lens system or have focus and optical zoom capability.

The audio component 1005 is configured to output and/or input audio signals. For example, the audio component 1005 includes a microphone ("MIC") configured to receive an external audio signal when the device 1000 is in an operation mode, such as a call mode, a recording mode, and a voice recognition mode. The received audio signal may be further stored in the memory 1002 or transmitted via the communication component 1008. In some embodiments, the audio component 1005 further includes a speaker to output audio signals.

The I/O interface 1002 provides an interface between the processing component 1001 and peripheral interface modules, such as a keyboard, a click wheel, buttons, and the like. The buttons may include, but are not limited to, a home button, a volume button, a starting button, and a locking button.

The sensor component 1007 includes one or more sensors to provide status assessments of various aspects of the device 1000. For instance, the sensor component 1007 may detect an open/closed status of the device 1000, relative positioning of components, e.g., the display and the keypad, of the device 1000, a change in position of the device 1000 or a component of the device 1000, a presence or absence of user contact with the device 1000, an orientation or an acceleration/deceleration of the device 1000, and a change in temperature of the device 1000. The sensor component 1007 may include a proximity sensor configured to detect the presence of nearby objects without any physical contact. The sensor component 1007 may also include a light sensor, such as a CMOS or CCD image sensor, for use in imaging applications. In some embodiments, the sensor component 1007 may also include an accelerometer sensor, a gyroscope sensor, a magnetic sensor, a pressure sensor, or a temperature sensor.

The communication component 1008 is configured to facilitate communication, wired or wirelessly, between the device 1000 and other devices. The device 1000 can access a wireless network based on a communication standard, such as WiFi, 2G, or 3G, or a combination thereof. In one exemplary embodiment, the communication component 1008 receives a broadcast signal or broadcast associated information from an external broadcast management system via a broadcast channel. In one exemplary embodiment, the communication component 1008 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods. Each module in FIGS. 5-9 discussed above, such as the obtaining module 501, the determining module 502, and the disabling module 503 may take the form of a packaged functional hardware unit designed for use with other components, a portion of a program code (e.g., software or firmware) executable by the processor 1009 or the processing circuitry that usually performs a particular function of related functions, or a self-contained hardware or software component that interfaces with a larger system, for example.

In exemplary embodiments, there is also provided a non-transitory computer-readable storage medium including instructions, such as included in the memory 1002, executable by the processor 1009 in the device 1000, for performing the above-described methods. For example, the non-transitory computer-readable storage medium may be a ROM, a RAM, a CD-ROM, a magnetic tape, a floppy disc, an optical data storage device, and the like.

When the instructions in the storage medium are executed by a processor of a mobile terminal, the mobile terminal is caused to perform a method for permission management, including:

obtaining fingerprint information of a user based on a touch operation on a preset interface of a terminal by the user;

determining whether the user is an authorized user according to the obtained fingerprint information; and when the user is an unauthorized user, disabling a permission for modifying configurations of the terminal by the user.

Other embodiments of the present disclosure will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present only be limited by the appended claims.

What is claimed is:

1. A method, comprising:
    displaying an interactive content on a preset interface of a terminal, the preset interface configured to trigger a first operation response independent of a second operation response based on an amount of time the preset interface is touched at a location where the interactive content is displayed;
    detecting a long-press event representative of the preset interface being touched at the location longer than a threshold time value;
    obtaining, by the terminal, fingerprint information corresponding to the long-press event;
    determining the fingerprint information does not correspond to authorized fingerprint information;
    disabling, by the terminal, in response to the fingerprint information not being authorized fingerprint information, a permission to permit performance of the first operation response;
        detecting, after detection of the long press event, a press event representative of the preset interface being touched at the location less than the threshold time value; and
        controlling access to the interactive content displayed at the location on the preset interface based on the amount of time the preset interface is pressed at the location by:
            restricting, in response to the long-press event, after the permission is disabled, performance of the first operation response; and
    permitting, in response to the press event, after the permission is disabled, performance of the second operation response.

2. The method of claim 1, further comprising:
    determining the terminal is unlocked;
    monitoring touch events in response to determination that the terminal is unlocked.

3. The method of claim 1, wherein the preset interface comprises a visible region of a screen of the terminal.

4. The method of claim 1, wherein the step of disabling the permission further comprises:
    determining the long-press event triggers a configuration modifying event for the terminal, the permission associated with the configuration modifying event.

5. The method of claim 1, wherein after disabling the permission, the method further comprising:
    displaying prompt information on the preset interface.

6. The method of claim 1, wherein the permission comprises at least one of: a permission for moving icons of applications, a permission for creating a new folder, a permission for removing applications from a folder, a permission for deleting applications, or a permission for modifying system settings.

7. A device for permission management, comprising:
    a processor, the processor is configured to:
    display, on a preset interface of the device, an interactive content which triggers a first operation response independent of a second operation response based on an amount of time the preset interface is touched at a location on the preset interface where the interactive content is displayed;
    obtain fingerprint information based on a first touch operation at the location on the preset interface of the device, the first touch operation having a first touch time greater than a predetermined threshold value;
    determine the fingerprint information is not associated with an authorized user based on previously obtained fingerprint information associated with the authorized user;
    disable, in response to the fingerprint information not being associated with the authorized user, a permission indicating authorization of the first operation response;
    obtain the fingerprint information based on a second touch operation at the location on the preset interface of the device, the second touch operation having a second touch time less than the predetermined threshold value; and
    control access to the interactive content at the location on the preset interface based on the amount of time the preset interface is pressed, wherein to control access, the processor is configured to:
        permit, after the permission is disabled, in response to the second touch operation having the second touch time less than the predetermined threshold value, performance of the second operation response; and
        restrict, after the permission is disabled, in response to the first touch operation having the first touch time greater than the predetermined threshold value, performance of the first operation response.

8. The device of claim 7, wherein the processor is further configured to: monitor touch events generated by the preset interface of the device;
    determine a monitored touch event is a long-press event; and
    in response to determination that the monitored touch event is the long-press event:
        obtain a touch point of the long-press event, and
        obtain the fingerprint information at a position of the preset interface corresponding to the touch point.

9. The device of claim 7, wherein the processor is further configured to:
    determine the device is unlocked; and
    in response to the device being unlocked, start to monitor touch events generated by the preset interface of the device.

10. The device of claim 7, wherein the preset interface comprises a visible region of a screen of the device.

11. The device of claim 7, wherein the processor is further configured to:
    determine the first touch operation triggers a configuration modifying event for the device; and
    disable the permission in response to determination that the first touch operation triggers the configuration modifying event for the device.

12. The device of claim 11, wherein
    the processor is further configured to output prompt information via the preset interface after the permission is disabled.

13. The device of claim 7, wherein the permission comprises at least one of a permission for moving icons of applications, a permission for creating a new folder, a permission for removing applications from a folder, a permission for deleting applications, or a permission for modifying system settings.

14. A non-transitory computer-readable storage medium comprising instructions executable by a processor, the instructions comprising:
    instructions executable by the processor to display an interactive content on a preset interface of a terminal,
    instructions executable by the processor to trigger a first operation response independently of a second operation response based on an amount of time the preset interface is touched at a location on the preset interface where the interactive content is displayed;

instructions executable by the processor to obtain fingerprint information based on a first touch operation at the location on the preset interface of the terminal, the first touch operation having a first touch time greater than a predetermined threshold;

instructions executable by the processor to determine that the fingerprint information is not associated with previously authorized fingerprint information;

instructions executable by the processor to disable a permission to trigger performance of the first operation response;

instructions executable by the processor to detect a second touch operation at the location on the preset interface of the terminal, the second touch operation having a second touch time less than the predetermined threshold; and instructions executable by the processor to control access to the interactive content at the location of the preset interface, wherein to control access, the instructions executable by the processor further comprise:

instructions executable by the processor to restrict, in response to the first touch operation, performance of the first operation response after the permission is disabled; and instructions executable by the processor to trigger, in response to the second touch operation, performance of the second operation response after the permission is disabled.

15. The non-transitory computer-readable storage medium of claim 14, the non-transitory computer-readable storage medium further comprising:

instructions executable by the processor to monitor touch events generated by the preset interface of the terminal;

instructions executable by the processor to determine a monitored touch event is a long-press event;

instructions executable by the processor to obtain, in response to determination that the monitored touch event is the long-press event, a touch point position of the long-press event; and instructions executable by the processor to obtain the fingerprint information at the touch point position of the preset interface corresponding to the touch point.

16. The non-transitory computer-readable storage medium of claim 14, further comprising:

instructions executable by the processor to determine the terminal is unlocked; and instructions executable by the processor to start to monitor, in response to the terminal being unlocked, touch events generated by the preset interface of the terminal.

17. The non-transitory computer-readable storage medium of claim 14, wherein the preset interface comprises a visible region of a screen of the terminal.

18. The non-transitory computer-readable storage medium of claim 14, further comprising:

instructions executable by the processor to determine the first touch operation triggers a configuration modifying event for the terminal; and instructions executable by the processor to disable the permission in response to determination that the first touch operation triggers the configuration modifying event for the terminal.

19. The non-transitory computer-readable storage medium of claim 14, further comprising:

instructions executable by the processor to detect a third touch operation after the permission is disabled, the third touch operation having a corresponding touch time greater than the predetermined threshold value;

instructions executable by the processor to obtain additional fingerprint information corresponding to the third touch operation;

instructions executable by the processor to determine that the additional fingerprint information corresponds to the previously authorized fingerprint information; and instructions executable by the processor to enable the permission in response to determination that the additional fingerprint information corresponds to the previously authorized fingerprint information.

* * * * *